(12) United States Patent
Dachiku

(10) Patent No.: US 8,542,985 B2
(45) Date of Patent: Sep. 24, 2013

(54) MOVING IMAGE PLAYBACK APPARATUS

(75) Inventor: Kenshi Dachiku, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 288 days.

(21) Appl. No.: 12/742,038

(22) PCT Filed: Nov. 10, 2008

(86) PCT No.: PCT/JP2008/003243
§ 371 (c)(1),
(2), (4) Date: Jul. 27, 2010

(87) PCT Pub. No.: WO2009/060630
PCT Pub. Date: May 14, 2009

(65) Prior Publication Data
US 2010/0290760 A1    Nov. 18, 2010

(30) Foreign Application Priority Data
Nov. 9, 2007   (JP) .................................. 2007-292424

(51) Int. Cl.
*H04N 5/93* (2006.01)
(52) U.S. Cl.
USPC .......................................... 386/353; 386/354
(58) Field of Classification Search
None
See application file for complete search history.

(56) References Cited

U.S. PATENT DOCUMENTS

| | | | |
|---|---|---|---|
| 7,437,054 B2 * | 10/2008 | Noh et al. | 386/347 |
| 7,720,336 B2 * | 5/2010 | Kashima | 385/46 |
| 7,848,610 B2 * | 12/2010 | Koyabu et al. | 386/200 |
| 2006/0233533 A1 | 10/2006 | Hosoya | |
| 2007/0212028 A1 | 9/2007 | Naito | |

FOREIGN PATENT DOCUMENTS

| | | |
|---|---|---|
| JP | 10 98713 | 4/1998 |
| JP | 2006 303652 | 11/2006 |
| JP | 2007 235547 | 9/2007 |
| JP | 2007-235547 A | 9/2007 |

OTHER PUBLICATIONS

Notice Of Decision for Patent issued May 20, 2012, in Korean Patent Application No. 10-2010-7010154 with English translation.

* cited by examiner

*Primary Examiner* — William C Vaughn, Jr.
*Assistant Examiner* — Asher Khan
(74) *Attorney, Agent, or Firm* — Oblon, Spivak, McClelland, Maier & Neustadt, L.L.P.

(57) ABSTRACT

A moving image playback apparatus capable of starting within a short time to play back reverse direction moving images is provided. The apparatus includes two decoders and one output buffer. In standby, using I-picture in a specified GOP as a reference, a controller causes a storage device to sequentially read first coded image data of the pictures in a first GOP preceding a specified GOP and the pictures up to I-picture in the specified GOP, and causes a first decoder to decode the first coded image data. Moreover, during the decoding of the first decoder, the controller causes the storage device to sequentially read second coded image data of the pictures in the specified GOP and the pictures up to I-picture in a second GOP following the specified GOP, and causes a second decoder to decode the second coded image data. Thereafter, the controller causes the outputs from the first and second decoders to be written to the output buffer. Thereby, the decoded image data are outputted from the output buffer immediately upon start of reverse playback, and moving images are played back.

5 Claims, 5 Drawing Sheets

MOVING IMAGE PLAYBACK APPARATUS

FIELD OF THE INVENTION

The invention relates to a moving image playback apparatus applied to a broadcast program transmission system configured to store content to be transmitted as a broadcast program, for example. Particularly, the invention relates to a moving image playback apparatus to allow checking of content stored in a storage device by playing back the content in a forward direction or in a reverse direction.

BACKGROUND

The broadcast program transmission system is configured: to beforehand store content to be transmitted as broadcast programs in a storage server, and to play back and broadcast a specified content in accordance with an instruction from an automatic program controller (APC). In the program transmission process, the content is usually checked in accordance with the broadcasting sequence before the broadcasting.

In the checking of content to be broadcasted, an operator previews the content in forward playback, fast forward playback, reverse playback and skip playback while the content from the storage sever is sequentially read. A proposal was made on a method capable of smoothly acquiring a reversely-played back image even when a preview is switched from a forward playback mode to a reverse playback mode (a patent document 1, for example).

Patent document 1: JP, P2006-303652A In content check, the moving image playback apparatus requires time to acquire a reversely-played back image after switching from a standby mode to a reverse playback mode. To put it specifically, since a B-picture is a bi-directionally predictive coded picture in moving image data with an open GOP (group of pictures) structure, a B-picture preceding the I-picture cannot be decoded without the image data in the immediately preceding GOP. For this reason, the moving image data needs to be sequentially decoded from the I-picture in the immediately preceding GOP. When the moving image playback apparatus is in the standby mode at the I-picture in a particular GOP, the moving image playback apparatus needs to read and decode the image data in the immediately preceding GOP. Accordingly, the moving image playback apparatus takes time to start a reverse playback and display a reversely-played back image.

DISCLOSURE OF THE INVENTION

Subject to be Solved by the Invention

The moving image playback apparatus has a problem of requiring time to acquire a reversely-played back image after switching from a standby state. Accordingly, a method of reducing time needed to acquire a reversely-played back image has been strongly desired.

An object of the invention is to provide a moving image playback apparatus capable of starting within a short time to play back a moving image in a reverse direction.

Means to Solve the Subject

To achieve the above object, a moving image playback apparatus according to the invention includes a storage device configured to beforehand store moving image data with a GOP (Group of Pictures) structure containing an I-picture being an intra-coded picture, a P-picture being a predictive picture produced based on the I-picture, and a B-picture produced based on the P-picture, a first decoder configured to decode the coded image data read from the storage device and to output the decoded image data, a second decoder configured to decode the coded image data read from the storage device and to output the decoded image data, a selector configured to selectively output the image data outputted from the first decoder and the image data outputted from the second decoder, an output buffer configured to store and output the image data outputted from the selector, and a controller configured to control a read process performed by the storage device, decode processes performed by the first decoder and the second decoder, and a switch process performed by the selector. Under a standby state, with the I-picture of a specified GOP used as a reference, the controller causes the storage device to perform reading in which first coded image data of pictures in a first GOP immediately preceding the specified GOP and pictures up to the I-picture in the specified GOP following the first GOP are sequentially read from the storage device, and causes the first decoder to decode the first coded image data. Moreover, while the first decoder is decoding the first coded image data, the controller causes the storage device to perform reading in which second coded image data of pictures in the specified GOP and pictures up to the I-picture in a second GOP following the specified GOP are sequentially read from the storage device, and causes the second decoder to decode the second coded image data. In addition, the controller causes the selector to alternately output the image data outputted from the first decoder and the image data outputted from the second decoder by switching. Furthermore, upon start of any one of forward playback and reverse playback, the controller causes the output buffer to output the image data.

In this configuration, the first and second decoders are used. Under the standby state, with the I-picture of the specified GOP used as a reference, the first coded image data of the pictures in the first GOP immediately preceding the specified GOP and the pictures up to the I-picture in the specified GOP following the first GOP are sequentially read from the storage device, and are decoded by the first decoder. In addition, while the first decoder is decoding the first coded image data, the second coded image data of the pictures in the specified GOP and the pictures up to the I-picture in the second GOP following the specified GOP are sequentially read from the storage device, and are decoded by the second decoder. Thereafter, the image data decoded by the first decoder and the image data decoded by the second decoder are stored in the output buffer.

For this reason, when the reverse playback is started, the moving image playback apparatus is capable of outputting the moving images by just outputting the decoded image data from the output buffer. Accordingly, the apparatus can make time needed to output the moving images after starting the reverse playback shorter than ever before. Furthermore, when the forward playback is started, the apparatus is capable of quickly outputting the moving images without any delay due to the decoding operation.

Effect of the Invention

The invention can provide a moving image playback apparatus which is capable of playing back a moving image in a reverse direction within a short time.

BRIEF DESCRIPTIONS OF THE DRAWINGS

EXPLANATION OF THE NUMERALS

Figure 1:
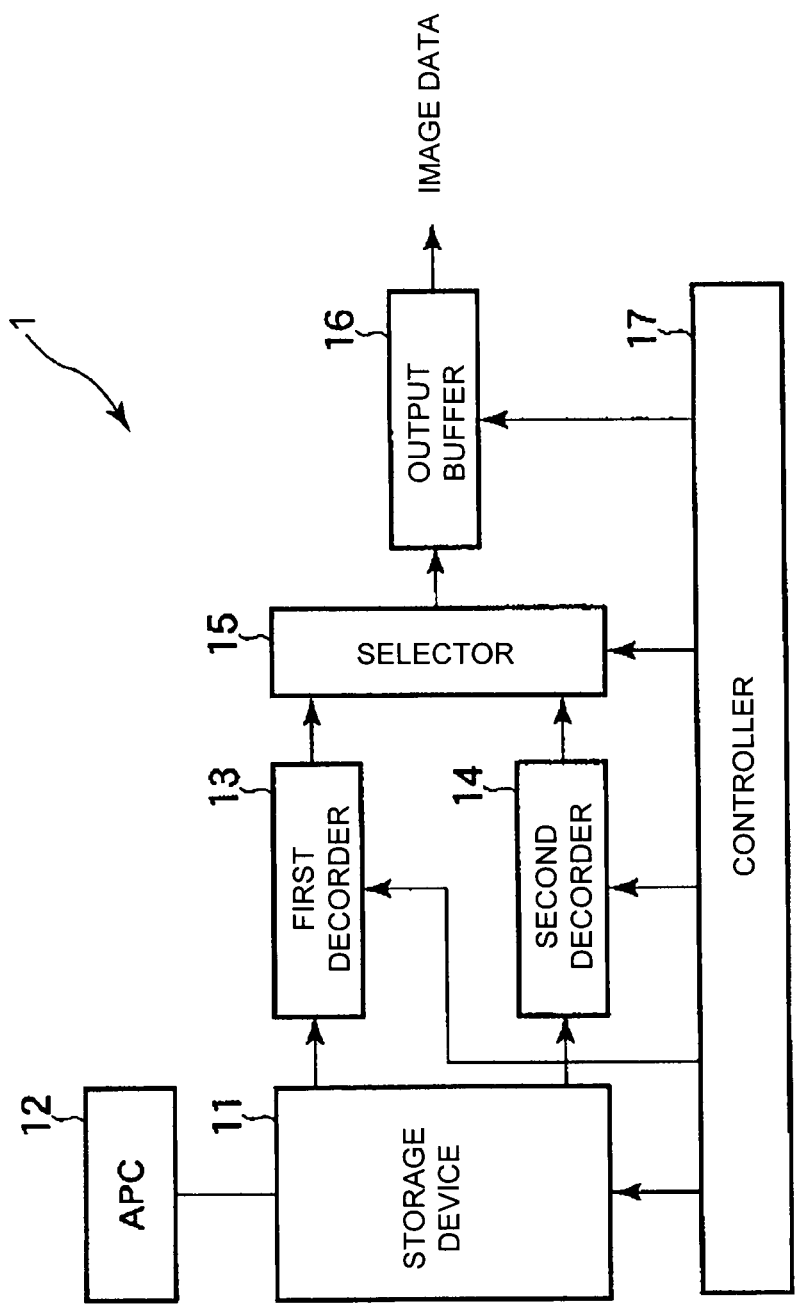
FIG. 1 is a block diagram showing a configuration of a moving image playback apparatus according to embodiment 1.

11 Storage device
12 APC
13 First decoder
14 Second decoder
15 Selector
16 Output buffer
18 First output buffer
19 Second output buffer
17 Controller

DETAILED DESCRIPTION OF THE PREFERRED EMBODIMENT

Hereinafter, a moving picture playback apparatus according to Embodiments of the invention will be described in detail with the reference to the drawings.

Embodiment 1

FIG. 1 is a block diagram showing a configuration of a moving image playback apparatus according to embodiment 1.

A storage device 11 beforehand stores content data (moving image data) for a broadcast program, and selectively reads the moving image data in accordance with a broadcast instruction signal given to the storage device 11 by an APC (automatic program transmission controller) 12. A first decoder 13 and a second decoder 14 decode coded moving image data thus read, and output the decoded image data. The image data are inputted into a selector 15. Then, the selector 15 selectively stores the image data in an output buffer 16. The image data stored in the output buffer 16 are outputted as moving image data from the output buffer 16 by a controller 17 when needed.

Furthermore, in accordance with an operation input instruction from an operator, the controller 17 controls the read and write of coded image data from and to the storage device 11, the decoding of the coded image data by the first decoder 13 and the second decoder 14, the switching of the selector 15, and the read and write of the image data from and to the output buffer 16.

Detailed descriptions will be herein below provided for various control processes which are performed by the controller 17.

The moving image playback apparatus 1 causes an image data sequence with a GOP structure, which is read from the storage device 11, to be inputted into each of the first decoder 13 and the second decoder 14.

Figure 5:
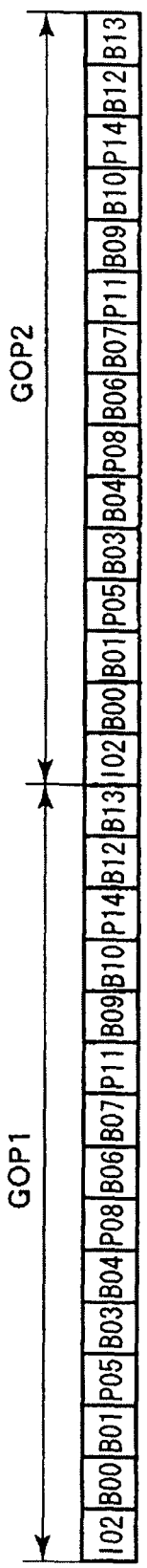
FIG. 5 is a diagram showing a GOP structure.
Figure 6:
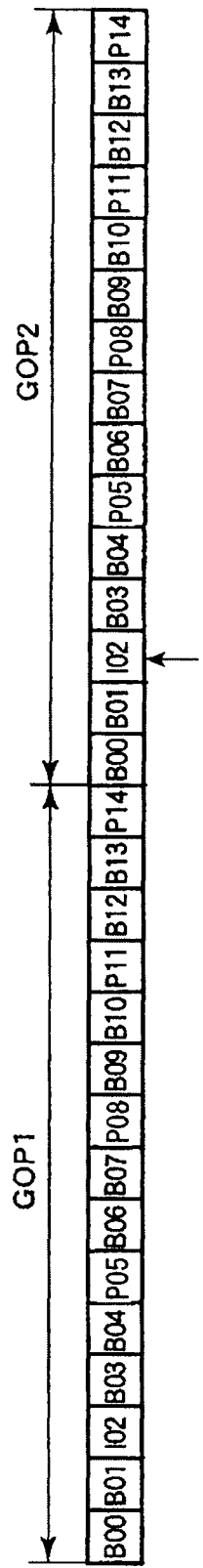
FIG. 6 is a diagram showing an order in which moving image data with a GOP structure is decoded.

First of all, the GOP structure will be described using FIG. 5. The GOP structure has three picture types of an I(intra)-picture, a P(predictive)-picture and a B(bi-directionally predictive)-picture. The I-picture is intra-coded, the P-picture is forwardly predictive coded, and the B-picture is bi-directionally predictive coded. In other words, each GOP contains at least one I-picture being an intra-coded picture, P-pictures being predictive pictures produced based on the I-picture, and B-pictures produced based on the I-picture and the P-pictures. The arrangement order in the GOP structure is IBBPBBPBBPBBPBB, and one GOP period is usually set up for 15 pictures, for example. When the GOP structure is out of order, troubles such as image disturbance and image interruption occur during image playback. In addition, moving image data is recorded in the storage device in the above-mentioned arrangement order, whereas, as shown in FIG. 6, the moving image data is decoded in the order of BBIBBPBBPBBPBBP when the moving image is played back.

In moving image data with an open GOP structure, a B-picture preceding the I-picture cannot be decoded without image data in the immediately preceding GOP, because the B-picture is a bi-directionally predictive coded picture. Let us assume that, as shown in FIG. 6, the moving image playback apparatus is found in a standby state at I02-picture within GOP2 by fast search. B00-picture or B01-picture in GOP2 cannot be decoded without data of immediately preceding P14-picture in GOP1. In order to decode P14-picture, the pictures from I02-picture, which precedes P14-picture, have to be sequentially decoded. For this reason, a delay of approximately 0.5 seconds (equivalent to 15 pictures) occurs between the start of the reverse playback and the display of B01 picture.

Figure 2:
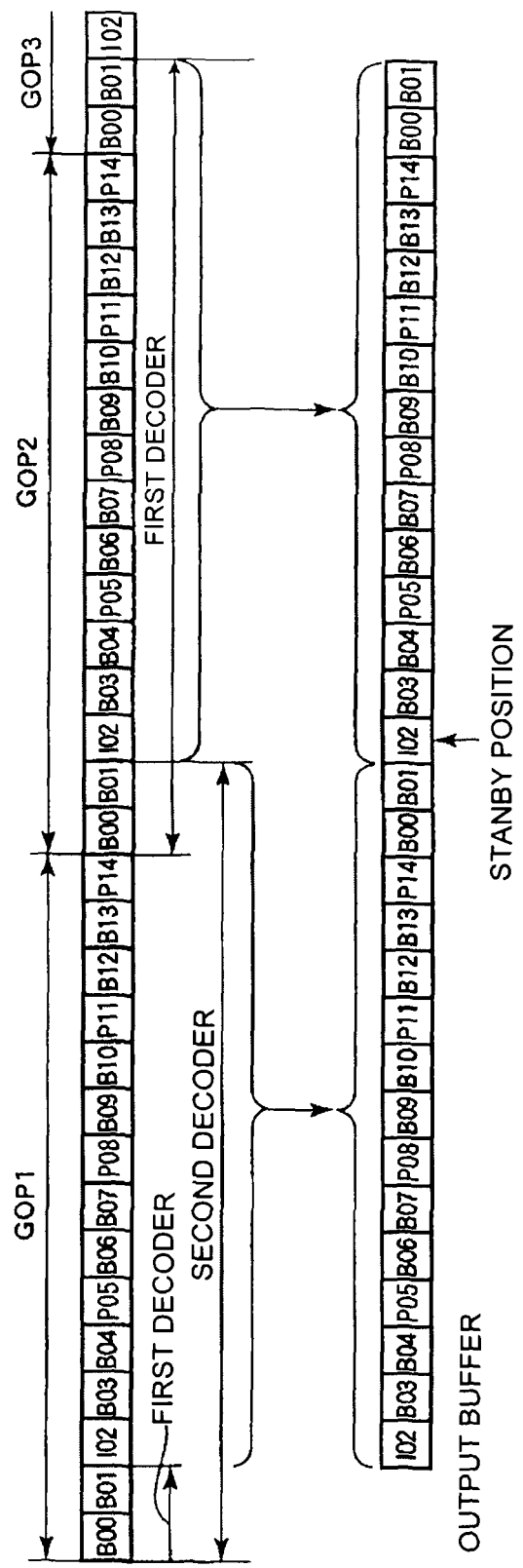
FIG. 2 is a diagram used to explain a playback operation of the moving image playback apparatus according to embodiment 1.

FIG. 2 shows a relationship among coded image data to be decoded, the decoders configured to decode the corresponding coded image data, and the output buffer configured to store the decoded image data. As soon as the moving image playback apparatus 1 according to the embodiment is in the standby state, as shown in FIG. 2, the moving image playback apparatus 1 decodes the coded image data of the pictures in the two successive GOPs, and stores the decoded image data in the output buffer 16. To put it specifically, the moving image playback apparatus 1 actuates the first decoder 13 and the second decoder 14 at the same time. Thereby, the apparatus 1 decodes the coded image data of the pictures in the preceding and following GOPs at the same time. By using I02-picture in GOP2 being a standby position as a reference, the controller 17 causes the storage device 11 to read the coded image data of the pictures in GOP1 (including B00-picture through P14-picture) preceding GOP2, as well as the coded image data of B00-picture, B01-picture and I02-picture in GOP2 following GOP1, from the storage device 11. Subsequently, the controller 17 causes the second decoder 14 to decode the coded image data of the 15 pictures in one GOP period from I01-picture in GOP1 through B01-picture in GOP2 which immediately precedes I02-picture. In addition, while the second decoder 14 is decoding the coded image data, the controller 17 causes the storage device 11 to read the coded image data of the pictures in GOP2 (including B00-picture through P14-picture) inclusive of I02-picture being the standby position, as well as the coded image data of B00-picture, B01-picture and I02-picture in GOP3 following GOP2, from the storage device 11. Thereafter, the controller 17 causes the first decoder 13 to decode the coded image data of the 15 pictures in one GOP period from I02-picture in GOP2 being the standby position through B01-picture in GOP3 which immediately precedes I02-picture in GOP3.

B00-picture and B01-picture immediately preceding the first I-picture in each GOP, are discarded, because B00-picture and B01-picture cannot be decoded by the first decoder 13 or the second decoder 14. Afterward, the controller 17 causes the selector 15 to perform switching so that the decoded image data of the I-picture and following pictures are alternately outputted from the first decoder 13 and the second decoder 14 for each picture, and are then written into the output buffer 16. Note that the output buffer 16 is configured as a ring buffer. Here, the write pointer is set at a predetermined number for each picture and, as shown in FIG. 2, the output from the first decoder 13 and the output from the second decoder 14 are stored in the output buffer 16 in a way that, for each GOP, all the pictures contained in the GOP are stored in the respective successive locations. In the ring buffer, each of the write pointer and read pointer move to the leftmost end upon reaching the rightmost end.

If the write of the entire decoded image data to the output buffer 16 is completed, the image data are then outputted from the output buffer 16 as soon as the reverse playback is started and the moving images are accordingly played back. In addition, the image data are outputted from the output buffer 16 as soon as the forward playback is started, and the moving images are played back without any delay due to decoding.

Furthermore, once the playback is started, the controller 17 operates as follows. In accordance with the playback direction of the currently outputted GOP, the controller 17 causes the storage device to read the image data of the pictures in the GOP following the currently outputted GOP and the pictures up to the I-picture in the GOP following the GOP following the currently outputted GOP from the storage device, as a unit. Then, the controller 17 causes the storage device to input the thus-read coded image data in the first decoder 13 and the second decoder 14 alternately. Subsequently, the controller 17 causes the first decoder 13 and the second decoder 14 to decode the inputted coded image data. Thereafter, for each 15 pictures in one GOP period from the I-picture in the GOP through a picture immediately preceding the I-picture in the following GOP, the controller 17 causes the selector 15 and the output buffer 16 to alternately write the image data outputted from the first decoder 13 and the image data outputted from the second decoder 14 to the output buffer 16 sequentially. Thereafter, the controller 17 causes the image data to be sequentially read from the output buffer 16, and then causes the moving images to be played back.

Figure 3:
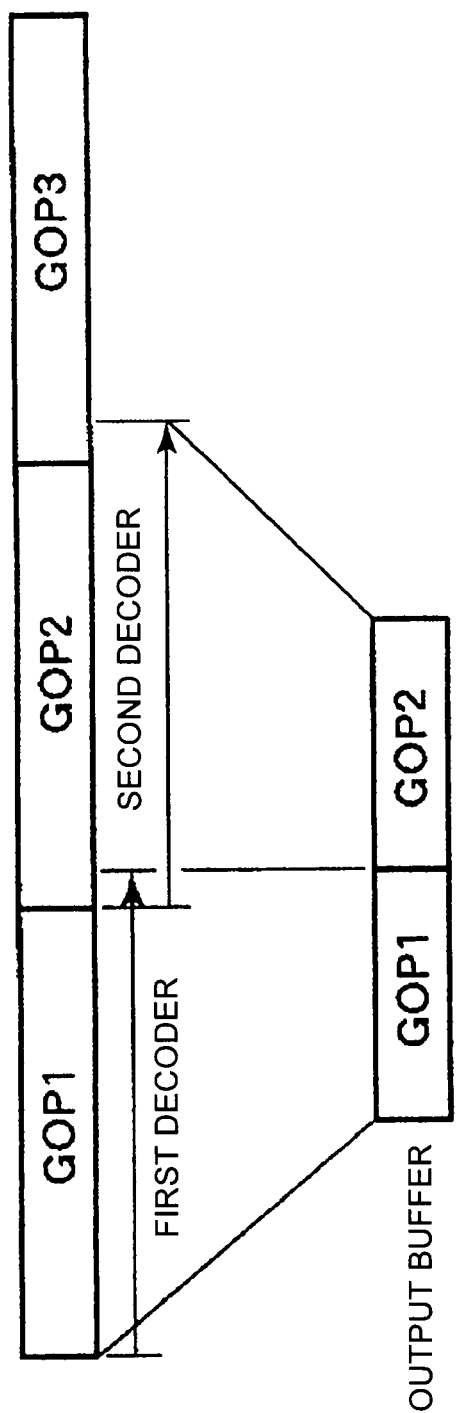
FIG. 3 is a diagram used to explain a playback operation which the moving image playback apparatus according to embodiment 1 carries out when thinning images depending on a playback speed.

In a case where the forward or reverse playback is performed at 1.1 to 1.9 times faster than the normal speed, as shown in FIG. 3, the controller 17 causes the first decoder 13 and the second decoder 14 to respectively thin output of the first decoder 13 and output of the second decoder 14 depending on the playback speed, and causes the thinned outputs to be written to the output buffer 16. When the decoded image data are outputted from the output buffer 16 at the normal speed, the moving images are played back 1.1 to 1.9 times faster than the normal speed.

The playback at a speed which is twice or more as fast as the normal speed can be achieved through control of the first decoder 13 and the second decoder 14 by controller 17 in order that the first decoder 13 and the second decoder 14 should decode only the I-pictures and P-pictures but no B-picture. The playback at a far faster speed can be achieved through control of the first decoder 13 and the second decoder 14 by the controller 17 in order that the first decoder 13 and the second decoder 14 should decode only the I-pictures.

As described above, according to embodiment 1, the moving image playback apparatus 1 uses the two decoders, that is to say, the first decoder 13 and the second decoder 14. Under the standby state, with the I-picture in a specified GOP is used as a reference, the controller 17 causes the storage device 11 to sequentially read first coded image data of the pictures in a GOP immediately preceding the specified GOP, as well as B00-picture, B01-picture and I02-picture in the specified GOP following the first GOP, from the storage device 11. Afterward, the controller 17 causes the second decoder 14 to decode the thus-read first coded image data, and to write the decoded image data in one GOP period from the I-picture in the immediately preceding GOP through a picture immediately preceding the I-picture in the specified GOP to the output buffer 16. In addition, while the second decoder 14 is decoding the first coded image data, the controller 17 causes the storage device 11 to sequentially read second coded image data of the pictures in the specified GOP, as well as B00-picture, B01-picture and I02-picture in the following GOP, from the storage device 11. Subsequently, the controller 17 causes the first decoder 13 to decode the thus-read second coded image data, and to write the decoded image data in one GOP period from the I-picture serving as the reference through a picture immediately preceding the I-picture in the following GOP to the output buffer 16.

Here, the coded image data in the two successive GOPs are decoded by using the standby position as the reference. Accordingly, the moving image playback apparatus can make the time needed to output moving images after starting a reverse playback shorter than ever before at the start of the reverse playback. Furthermore, the moving image playback apparatus is capable of quickly outputting the moving images without any delay due to the decoding operation, at the start of a forward playback. Moreover, for each two GOPs, the coded image data in the preceding GOP are decoded by one of the two decoders, and the coded image data in the following GOP are decoded by the other of the two decoders. Accordingly, the moving image playback apparatus can make the time needed to decode the coded image data shorter than ever before. In addition, the apparatus can play back the moving images quickly, even when the playback mode is changed from the forward playback to the reverse playback.

Embodiment 2

Figure 4:
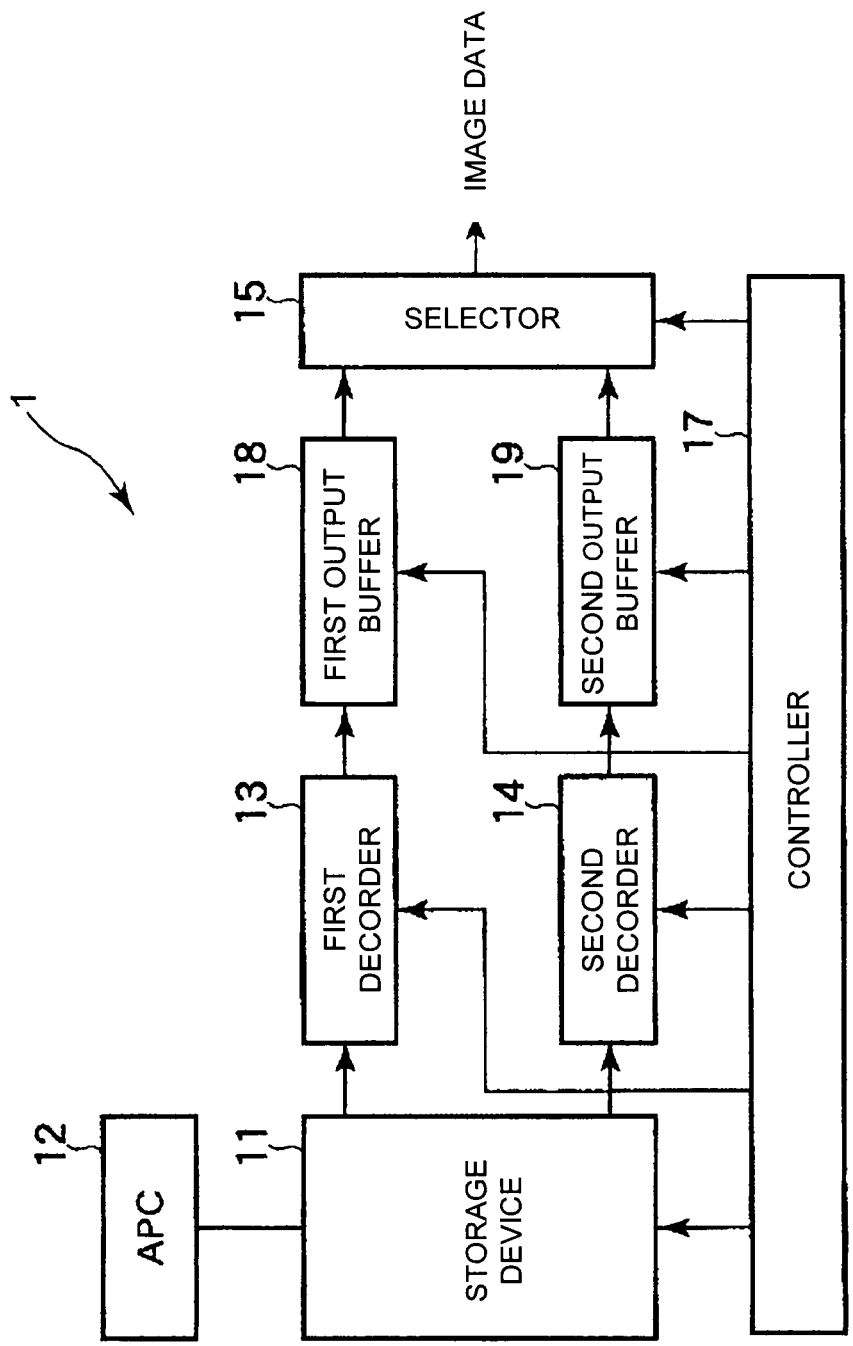
FIG. 4 is a block diagram showing a configuration of a moving image playback apparatus according to embodiment 2.

FIG. 4 is a block diagram showing a configuration of a moving image playback apparatus according to embodiment 2. Note that, in FIG. 4, the same portions as those shown in FIG. 1 will be denoted by the same reference numeral, and detailed description for the portions will be omitted.

The moving image playback apparatus 1 according to Embodiment 2 is different from the moving image playback apparatus according to Embodiment 1 in that a first output buffer 18 and a second output buffer 19 are provided to the output stages of the first decoder 13 and the second decoder 14, respectively.

The controller 17 causes the storage device 11 to read coded image data from the storage device 11, and causes the first decoder 13 and the second decoder 14 to decode the read coded image data. Subsequently, the decoded image data outputted from the first decoder 13 are stored in the first output buffer 18, and are outputted depending on the necessity. In addition, the decoded image data outputted from the second decoder 14 are stored in the second output buffer 19, and are outputted depending on the necessity.

The image data stored in the first output buffer 18 or the image data stored in the second output buffer 19 are selectively outputted by the selector 15. Unlike the case of Embodiment 1, the switch operation of the selector 15 is controlled by the controller 17 for each GOP period even in the standby state.

Thereafter, if the write of the image data to the first output buffer 18 and the second output buffer 19 are completed, the image data are quickly outputted from the first output buffer 18 or the second output buffer 19 as soon as the reverse playback is started, and the moving images are accordingly played back. In addition, the image data are outputted from the first output buffer 18 or the second output buffer 19 as soon as the forward playback is started, and the moving images are accordingly played back, without any delay due to the decoding.

Once the playback is started, each time image data become no longer necessary as a result of completion of output of the image data from one of the two output buffers and the like, the coded image data of the pictures in the GOP next to the currently outputted GOP in the playback direction and the pictures up to the I-picture in the second next GOP are read from the storage device 11. The read coded image data are decoded by the decoder connected to the output buffer storing the image data which become no longer necessary. Subsequently, decoded image data in one GOP period from the I-picture in the GOP through a picture immediately preceding the I-picture in the following GOP are overwritten to the output buffer. Thereafter, the output from the output buffer 18 and the output from the output buffer 19 are switched for each GOP period, and the image data are sequentially read.

In the case of Embodiment 2, the decoded image data in one of two successive GOPs are stored in the first output buffer, and the decoded image data in the other of the two successive GOPs are stored in the second output buffer. For this reason, the moving image playback apparatus is capable of making the time needed to output the moving images after starting the reverse playback shorter than ever before at the start of reverse playback as in case of Embodiment 1. In addition, the moving image playback apparatus can quickly output the moving images without any delay due to the decoding at the start of forward playback as well. Moreover, for each two GOPs, the coded image data in the preceding GOP are decoded by one of the two decoders, and the coded image data in the following GOP are decoded by the other of the two decoders. Accordingly, the moving image playback apparatus can make the time needed to decode coded image data shorter than ever before. In addition, the apparatus can play back the moving images quickly, even when the playback mode is changed from the forward playback to the reverse playback.

Note that the invention is not limited to Embodiment 1 and Embodiment 2 which have been described above. The invention can be carried out by variously modifying the configuration of the moving image playback apparatus, the sequence of the playback control within the scope of the gist of the invention.

INDUSTRIAL APPLICABILITY

The invention can make the time needed for a moving image playback apparatus to output a moving image after starting a reverse playback shorter than ever before, in a case where the reverse playback is started in a standby state. Accordingly, the invention can be applied to a moving image playback apparatus which is used for the purpose of carrying out forward playback, pause, and reverse playback repeatedly.

What is claimed is:

1. A moving image playback apparatus comprising:
    a storage device configured to beforehand store coded image data with a GOP (Group of Pictures) structure containing an I-picture being an intra-coded picture, a P-picture being a predictive coded picture produced based on the I-picture, and a B-picture produced based on the P-picture;
    a first decoder configured to decode the coded image data read from the storage device, and to output the decoded image data;
    a second decoder configured to decode the coded image data, and to output the decoded image data;
    a first output buffer configured to store and output the image data outputted from the first decoder;
    a second output buffer configured to store and output the image data outputted from the second decoder;
    a selector configured to selectively output the output from the first output buffer and the output from the second output buffer; and
    a controller configured to control a read process performed by the storage device, decode processes performed by the first decoder and the second decoder, and a switch process performed by the selector, wherein
    (a) under a standby state,
        with the I-picture of a specified GOP used as a reference, the controller causes the storage device to perform reading in which first coded image data of pictures in a first GOP immediately preceding the specified GOP and pictures up to the I-picture in the specified GOP following the first GOP are sequentially read from the storage device, and causes the first decoder to decode the first coded image data, and
        while the first decoder is decoding the first coded image data, the controller causes the storage device to perform reading in which second coded image data of pictures in the specified GOP and pictures up to the I-picture in a second GOP following the specified GOP are sequentially read from the storage device, and causes the second decoder to decode the second coded image data; and
    (b) upon start of any one of forward playback and reverse playback,
        the controller causes any one of the first output buffer and the second output buffer to output the corresponding image data.

2. The moving image playback apparatus according to claim 1, wherein
    during any one of the forward playback and reverse playback:
    the controller causes the storage device to perform reading in which coded image data of pictures in a GOP firstly following a GOP currently played back in the playback direction and pictures up to the I-picture in a GOP secondly following the GOP currently played back are read from the storage device, and to input the coded image data read alternately into the first decoder and the second decoder;
    the controller causes the first decoder and the second decoder to alternately decode the coded image data of the pictures in the GOP firstly following the GOP currently played back and the pictures up to the I-picture in the GOP secondly following the GOP currently played back; and
    the controller causes the selector to alternately output the output from the first output buffer and the output from the second output buffer by switching every GOP period.

3. The moving image playback apparatus according to claim 1, wherein
    under the standby state:
    the controller causes the first decoder to output decoded image data of pictures from the I-picture in the first GOP to a picture immediately preceding the I-picture in the specified GOP, out of the coded image data of the pictures in the first GOP and the pictures up to the I-picture in the specified GOP; and the controller causes the second decoder to output decoded image data of pictures from the I-picture in the specified GOP through a picture immediately preceding the I-picture in the second GOP, out of the coded image data of the pictures in the specified GOP and the pictures up to the I-picture in the second GOP.

4. The moving image playback apparatus according to claim 1, wherein at a certain playback speed, the controller causes the first decoder and the second decoder to thin out the corresponding decoded image data, and to write the decoded image data thinned in the first output buffer and the second output buffer, respectively.

5. The moving image playback apparatus according to claim 4, wherein the controller causes the first decoder and the second decoder to decode both the I-picture and the P-picture, or only the I-picture depending on a playback speed.

* * * * *